United States Patent [19]

Kawata

[11] Patent Number: 5,431,779
[45] Date of Patent: Jul. 11, 1995

[54] METHOD OF CONTROLLING EVAPORATOR FOR SALT MANUFACTURING PLANT

[75] Inventor: Norio Kawata, Kanagawa, Japan

[73] Assignee: Japan Tobacco, Inc., Tokyo, Japan

[21] Appl. No.: 35,274

[22] Filed: Mar. 22, 1993

[30] Foreign Application Priority Data

Mar. 31, 1992 [JP] Japan ................... 4-077417

[51] Int. Cl.$^6$ .................. B01D 1/00; C01D 3/06
[52] U.S. Cl. ..................... 159/47.1; 159/44;
23/295 R; 203/1; 423/158; 423/184; 423/497
[58] Field of Search ............ 159/44, DIG. 15, 47.1;
203/1; 423/497, 499, 155, 158, 159, 184, 195,
169; 23/295 R

[56] References Cited

U.S. PATENT DOCUMENTS

| | | | |
|---|---|---|---|
| 3,615,259 | 10/1971 | Neitzel | 159/903 |
| 3,989,472 | 11/1976 | Braithwaite et al. | 159/48.1 |
| 4,224,036 | 9/1980 | Geesen | 159/47.1 |
| 4,564,367 | 1/1986 | Heiss et al. | 159/44 |

FOREIGN PATENT DOCUMENTS

| | | |
|---|---|---|
| 54-128395 | 10/1979 | Japan . |
| 55-57146 | 4/1980 | Japan . |
| 448255 | 2/1992 | Japan . |

Primary Examiner—Wilbur Bascomb, Jr.

[57] ABSTRACT

An evaporator control method for a salt manufacturing plant includes the steps of: measuring the speed of sound of in a raw solution of salt which additionally includes magnesium chloride and calcium chloride accommodated in an evaporator; calculating the combined concentration of magnesium chloride and calcium chloride according to the speed of sound based on a calibration curve; and controlling a condition of the raw solution in the evaporator according to the combined concentration of magnesium chloride and calcium chloride.

3 Claims, 4 Drawing Sheets

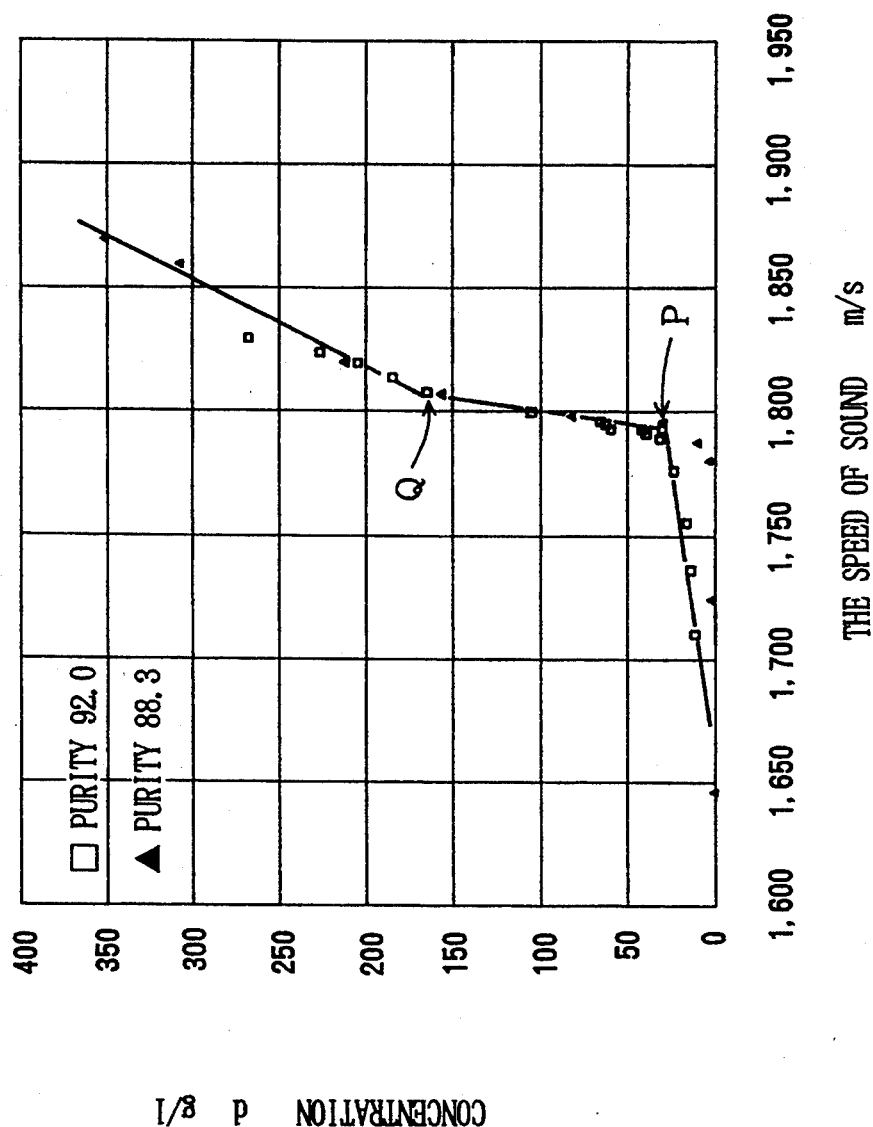

METHOD OF CONTROLLING EVAPORATOR FOR SALT MANUFACTURING PLANT

BACKGROUND OF THE INVENTION

1. Field of the Invention

This invention relates to an evaporator control method and an apparatus therefor to control condition of raw solution which is heated and concentrated in the evaporator in a salt manufacturing plant.

2. Description of the Prior Art

In a salt manufacturing plant, raw solution accommodated in an evaporator is heated to evaporate water so that salt is precipitated and deposited from a concentrated raw solution.

In the salt manufacturing process, the residual solution becomes rich since it becomes bitter and potassium chloride is precipitated when the final concentration becomes high in the bitter solution, and this reduces the precipitated and deposited quality of the salt. Therefore, the bitter solution should be discharged and new raw solution should be fed to the evaporator. As a result, the salt is continuously produced by adjusting the temperature of the solution in the evaporator so that potassium chloride and the like are not precipitated.

In a crystallizing process of concentrating the raw solution, the solution before the salt is precipitated is called "brine" and the solution is called "mother solution" once it reaches the condition that salt is precipitated. When the solution reaches the condition in which potassium chloride, magnesium chloride, and calcium chloride are precipitated it is called "bitter solution". Precipitation from the mother solution is optimal to obtain high quality salt.

In order to control the concentration of the raw solution which is boiled in the crystallizing process, it is required to determine the condition of the raw solution in the evaporator. However, it takes a long time to take samples from the raw solution and to determine the concentration of the raw solution through manual operation, that is, a lot of time is required from the sampling to the determination of the concentration, resulting in large fluctuations of the final boiling concentration. Therefore, the measurement of the concentration in real time should be automatically carried out to obtain the concentration to prevent the fluctuation thereof.

As a method of automatically measuring the concentration of the raw solution, it may be possible to introduce the raw solution into a pipe to measure the concentration with an ultrasonic concentration meter. The ultrasonic concentration meter measures the concentration based on the decrease of the frequency of an oscillated ultrasonic wave, as is disclosed in Japanese patent application laid-open Showa 54-128395 and 55-57146.

As described above, it is possible to measure the concentration of the raw solution in real time utilizing an oscillated ultrasonic wave. However, the concentration can not be controlled only through the concentration of the overall raw solution because a calibration curve which shows the relationship between the concentration of the overall raw solution and the sound speed varies according to the temperature. Therefore, the temperature of the raw solution as well as the concentration thereof should be taken into consideration.

In order to improve the efficiency of the salt manufacturing process, the concentration of the raw solution must be controlled in such a manner as to directly determine the condition of the raw solution i.e., such as "brine", "mother solution" or "bitter solution".

SUMMARY OF THE INVENTION

It is therefore an object of the present invention to control the concentration of the raw solution by directly determining the condition of the raw solution such as "brine", "mother solution" and "bitter solution".

An evaporator control apparatus for a salt manufacturing plant according to the present invention comprise: means for measuring the speed of sound in a raw solution accommodated in an evaporator; means for calculating a combined concentration of magnesium chloride and calcium chloride according to the speed of sound based on a calibration curve; means for controlling the condition of the raw solution in the evaporator according to the combined concentration of magnesium chloride and calcium chloride.

Further, an evaporator control method for a salt manufacturing plant according to the present invention comprises the steps of: measuring the speed of sound in a raw solution accommodated in an evaporator; calculating a combined concentration of magnesium chloride and calcium chloride according to the speed of sound based on a calibration curve; controlling the condition of the raw solution in the evaporator according to the combined concentration of magnesium chloride and calcium chloride.

FIG. 1 shows the calibration curve described above, which indicates the relationship between the combined concentration of magnesium chloride and calcium chloride, which are obtained by heating and concentrating the brine in the salt manufacturing plant, and the speed $v$ of sound in the solution.

As illustrated in the figure, the calibration curve consists of two inflection points and three lines. In a range up to the first inflection point P, the variation of the speed of sound is large. On the other hand, the change for the concentration is small. The reason of this phenomena is that coordination water, which does not lose a translational degree of freedom in spite of existing in the vicinity of ions, is evaporated due to the heat, which increases the speed of sound in the solution and prevents the other components from being changed. As a result, the change of the concentration becomes small. Therefore, it has been proven to be correct to judge the range up to the first inflection point as the range of the brine.

In a range from the first inflection point P to the second inflection point Q, the change of the speed of sound is remarkably small, but, the change of the concentration is considerably large. This is because the precipitation of the salt remarkably changes the composition of the solution and the hydration of ions other than the salt is stable, which causes the change in sound speed to be small. As a result, has been proven to be reasonable to judge the range from the first inflection point P to the second inflection point Q as the range of the mother solution.

In a range over the second inflection point Q, the speed of sound and the concentration increase with a gradient smaller than that of the range of the mother solution. This is because $Na^+$ in the solution is decreased in quantity and $K^+$ and $Mg^{2+}$ are combined with $Cl^-$ in the order of synersis to be precipitated as carnalite crystal, and the hydration of ions (which exist in the vicinity of $K^+$ and $Mg^{2+}$ and lose translational degree of freedom) is destroyed due to heat so that the ions are separated into crystal and coordination water at the same ratio. As a result, it has proven to be correct to judge the range above the second inflection point as the range of the bitter solution.

As described above, the condition of the solution can be classified directly into "brine", "mother solution" and "bitter solution" from the combined concentration of magnesium chloride, and calcium chloride which is measured based on the speed of sound in the solution. Further, the state of each condition can be grasped in detail.

Since the calibration curve of the combined concentration of magnesium chloride and calcium chloride does not change in accordance with the temperature, the feed rate of new raw solution, the discharged quantity of the bitter solution, and the heating temperature can be calculated according to the combined concentration of magnesium chloride and calcium chloride, which makes it easy to control the condition in the evaporator.

BRIEF DESCRIPTION OF THE DRAWINGS

The present invention will be more apparent from the ensuring description with reference to the accompanying drawing wherein:

FIG. 4 shows an example of measured values on the combined concentration of magnesium chloride and calcium chloride, and the speed of sound in a raw solution in a salt manufacturing plant which are obtained by calibrating operation according to the embodiment of the present invention.

DETAILED DESCRIPTION OF PREFERRED EMBODIMENTS

Figure 2:
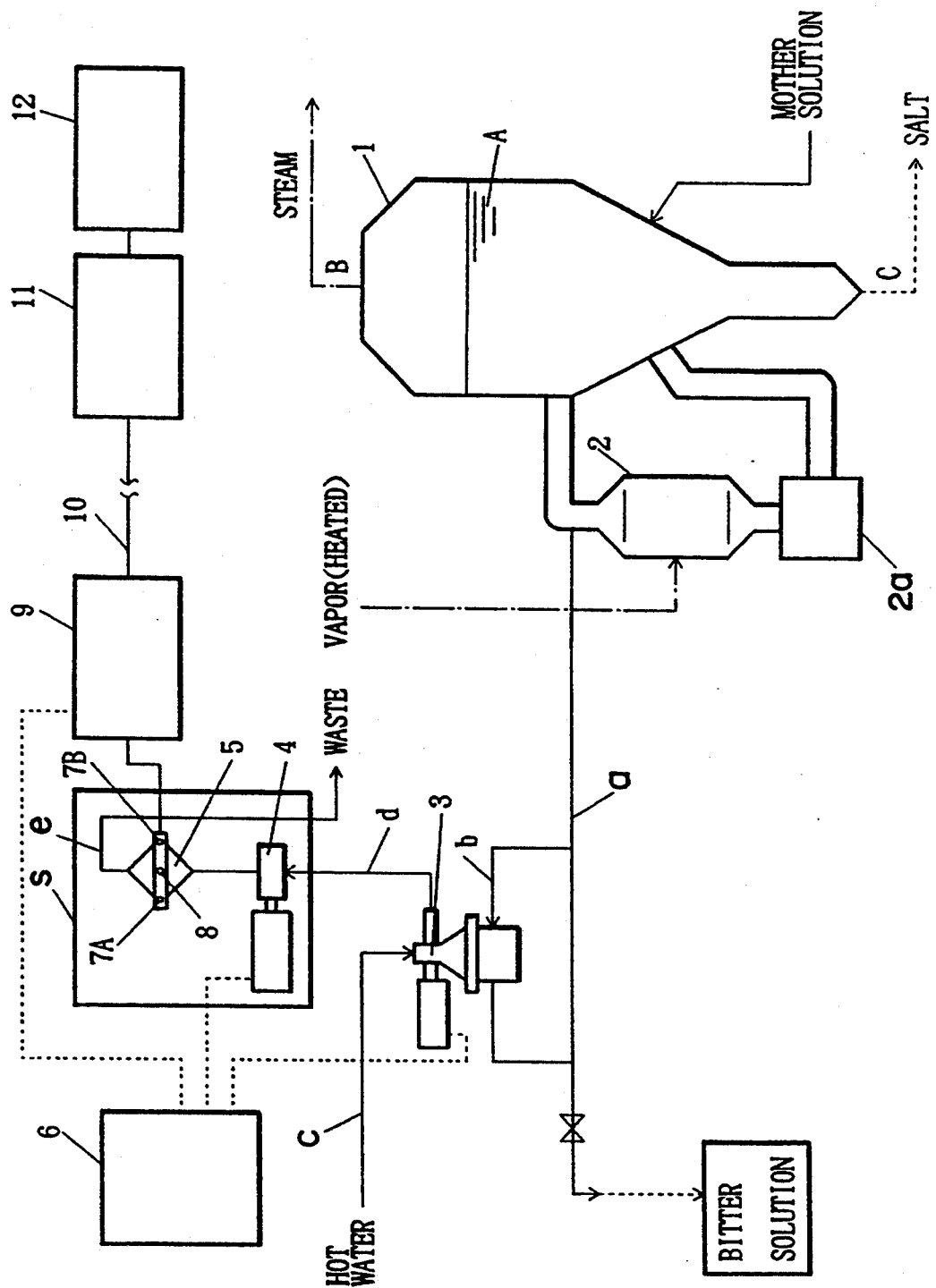
FIG. 2 is a flowchart of an evaporator control apparatus in a salt manufacturing plant according to the present invention.

FIG. 2 shows an evaporator control apparatus for a salt manufacturing plant according to an embodiment of the present invention. A mother solution, which is obtained by concentrating sea water and the like in another evaporator, not shown, is fed to an evaporator 1 as a raw solution A.

The evaporator 1 is provided with a heater 2 through a circulation pump 2a. The raw solution A accommodated in the evaporator 1 is heated by vapor which is fed to the heater 2 after circulating in the heater 2.

The heated raw solution A is concentrated by the vaporization in the evaporator 1 to become supersaturated, which causes salt to be precipitated. As a result, the salt C is discharged as deposits from the evaporator 1. The bitter solution is recovered through a discharge pipe a which is located between the evaporator 1 and the heater 2.

Further, when the raw solution A is the "brine" the discharged amount of the bitter solution and the fed amount of the raw solution (mother solution) is reduced and the heating is strengthened. On the other hand, when the raw solution is the bitter solution, the discharged amount of the bitter solution and the fed amount of the raw solution (mother solution) is increased and the heating is weakened. As a result, the raw solution A in the evaporator 1 is maintained at the same condition as the mother solution and the salt C is continuously recovered.

The discharge pipe a from which bitter solution is discharged is provided with a sampling pipe h which bypasses the discharge pipe a. The sampling pipe h is provided with a motor valve 3 which works as a three-way cock. The motor valve 3 is provided with a hot water pipe c for feeding hot water as well as the sampling pipe b. Further, the measuring section S is provided with another sampling pipe d for feeding the sample or the hot water.

At the measuring section S, the sampling pipe d from the motor valve 3 is connected to a sample vessel 5 by way of a sampling pump 4. Further, a discharge pipe e is connected to the sample vessel 5. The motor valve 3 and the sampling pump 4 are connected to a control panel 6.

A piezoelectric ceramics 7A and 7B, and a temperature sensor 8 are attached to the sample vessel 5 and they are further connected to a pulse transmitting and receiving section 9.

The pulse transmitting and receiving section 9 outputs pulse signals to the piezoelectric ceramics 7A to generate ultrasonic wave toward the sample vessel 5. Then, the ultrasonic wave transmitting the solution in the sample vessel 5 is detected by the piezoelectric ceramics 7B to measure time lag between the generation and the reception of the ultrasonic wave. Further, the temperature of the solution is measured by a thermometer 8.

The control board 6, comprising sequencers and the like, which controls the motor valve 3 and the sampling pump 4 in the measuring section S. That is, the control board 6 switches the operation of the motor valve 3 to provide the sample from the sampling pipe h to the measuring section S or the hot water from the hot water pipe to the measuring section S. Further, the sampling pump 4, which is driven for a predetermined period of time, provides a prescribed amount of hot water or sample to the sample vessel 5 according to the condition of the motor valve 3.

Further, the control panel 6 controls the discharge of the bitter solution, and the heating and the like based on the combined concentration of magnesium chloride and calcium chloride which are measured at the displaying section 11 as described below. This control method may be carried out with well-known techniques such as the control of the valves provided to the pipes, therefore, detailed explanation thereof will be omitted.

The pulse transmitting and receiving section 9 converts measured values showing a time lag between the generation and the reception of the ultrasonic wave and the temperature of the solution into optical signals and outputs the signal to the display section 11 by way of an optical fiber cable 10 one after anther. Further, the pulse transmitting and receiving section 9 outputs a command for starting the printing by a printer 12 to the display section 11 by way of the optical fiber cable 10 according to control signals from the control board 8.

The display section 11, comprising microcomputers and the like, measures the speed of sound of the sample in the sample vessel 5 based on the measured time which is inputted through the optical fiber cable 10. Then, the display section 11 converts the speed of sound to the combined concentration of magnesium chloride and calcium and chloride based on formulas corresponding to the calibration curve shown in FIG. 1. Then, the measured concentration and temperature are displayed by a displayer (not shown) in real time and these data as well as the time lag are stored.

Further, on inputting the command for starting printing from the optical fiber cable 10, the display section 11 outputs the stored data on the concentration to the control board 8 and outputs the data on the concentration and the temperature to the printer 12. Then, the printer 12 prints the data one after another.

As described above, the combined concentration of magnesium chloride and calcium chloride, and the speed of sound in the raw solution in the evaporator 1 are printed one after another, and the condition of the raw solution in the evaporator 1 can be determined substantially in real time based on these data. The control board 8 controls the evaporator 1 based on the measured combined concentration of magnesium chloride and calcium chloride as described above.

In the measuring apparatus according to the embodiment, the operation timing of the motor valve 3, the sampling pump 4, and the pulse transmitting and receiving section 9 is controlled through the control board 8. At the measuring operation, the sample is fed to the sample vessel 5 and the measurement is performed at the pulse transmitting and receiving section 9 after a period of time for fine particles to be precipitated in the sample. When the measurement is finished, the sample is discharged while feeding hot water, and the hot water is discharged while the sample for the next measurement is being fed to the sample vessel 5.

As described above, the sample vessel 5 and the pipes are cleaned by feeding the sample and hot water one after the other, which prevents a precipitate from being attached to the sample vessel 5 and the pipes.

Figure 3:
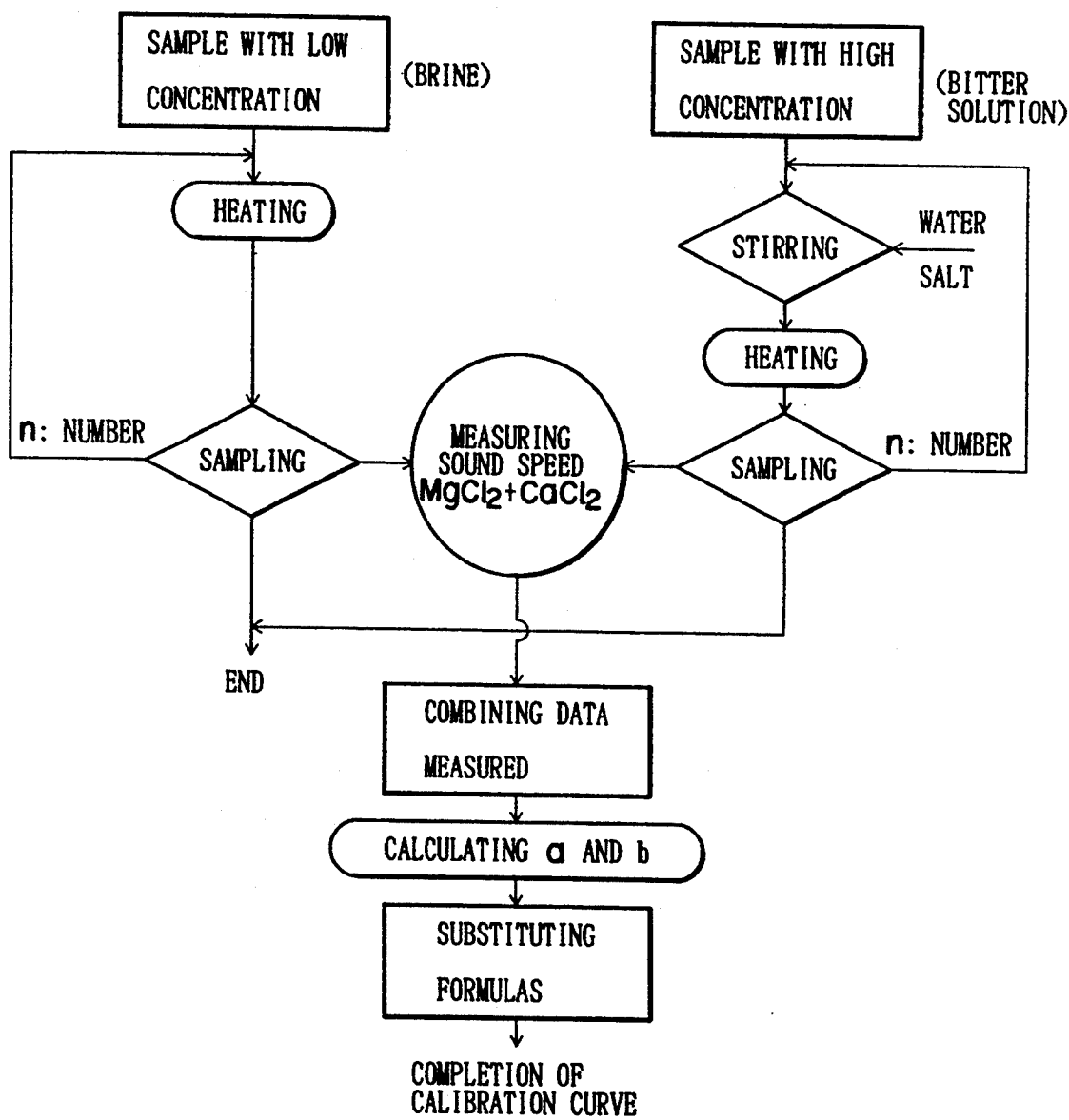
FIG. 3 shows the procedure of calibrating operation according to one embodiment of the present invention.

The formulas of the calibration curve on the combined concentration of the magnesium chloride and calcium chloride are determined by the calibrating procedure as exemplarily shown in FIG. 3.

A sample with low concentration, that is, a sample from the brine is prepared first. Then, the sample is heated with a gas heater, a water bath or the like, and samples are taken at predetermined intervals to perform regression analysis between the speed of sound in the samples each and the concentration thereof.

On the other hand, a sample with high concentration is prepared and is heated by the gas heater or the like while water and salt is added thereto and stirred. Then, samples are taken at predetermined intervals to perform regression analysis between the speed of sound in the samples each and the concentration thereof.

A gradient a and an interception h of the formulas each for calibration curve (three lines) and the speed of sound at the two inflection points are calculated by combining the above analyzing results. Then, the data obtained through the calculation is stored in memory of the display section 11, which are used when converting the speed of sound to the concentration.

Figure 1:
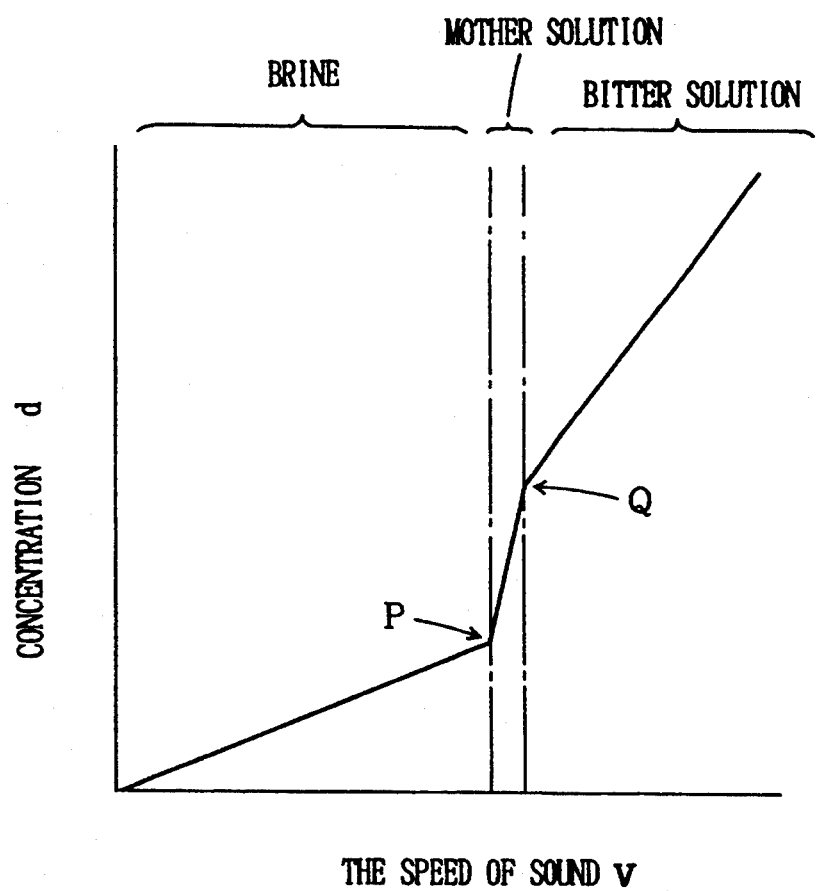
FIG. 1 shows the relationship between the combined concentration of magnesium chloride and calcium chloride, and the speed of sound in a raw solution in a salt manufacturing plant according to the present invention.

FIG. 4 shows an example of measured values an the combined concentration of magnesium chloride and calcium chloride, and the speed of sound in the raw solution. The measurement result shows that the calibration curve is represented by three lines with two inflection points as illustrated in FIG. 1.

As described above, with the evaporator control apparatus for a salt manufacturing plant according to the present invention, the combined concentration of chloride and calcium chloride is determined according to the measured speed of sound based on a calibration curve which is obtained in advance. As a result, the concentration of the raw solution can be controlled in such a manner as to directly determine the condition of the raw solution such as "brine", "mother solution" and "bitter solution" to control the evaporator, which provides the adequate control of the concentration.

What is claimed is:

1. An evaporator control method for a salt manufacturing plant comprising the steps of:
   measuring the speed of sound in a raw solution of sodium chloride in water which additionally contains magnesium chloride and calcium chloride in an evaporator;
   calculating the combined concentration of magnesium chloride and calcium chloride in said raw solution according to the speed of sound in said raw solution,
   controlling a precipitate condition of said raw solution in the evaporator so as to be in a range suitable for precipitating manufactured salt according to said calculated combined concentration of magnesium chloride and calcium chloride so as to precipitate said manufactured salt.

2. An evaporator control method for a salt manufacturing plant as claimed in claim 1, wherein said calculating step employs a calibration curve obtained by taking samples at timed intervals from the raw solution in the evaporator and performing regression analysis between the speed of sound in said samples and the concentration of said samples.

3. An evaporator control method for a salt manufacturing plant as claimed in claim 1, wherein said precipitate condition of the raw solution in the evaporator is controlled by controlling the feed rate of the raw solution, the amount of the raw solution discharged and the heating of the raw solution in the evaporator.

* * * * *